United States Patent
Bisale et al.

(10) Patent No.: US 11,244,037 B2
(45) Date of Patent: Feb. 8, 2022

(54) METHOD AND DEVICE FOR PROTECTING A TECHNICAL INSTALLATION

(71) Applicant: Siemens Aktiengesellschaft, Munich (DE)

(72) Inventors: Chaitanya Bisale, Nuremberg (DE); Andreas Kohl, Cadolzburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/697,596

(22) Filed: Nov. 27, 2019

(65) Prior Publication Data
US 2020/0167460 A1 May 28, 2020

(30) Foreign Application Priority Data
Nov. 28, 2018 (EP) .................... 18208836

(51) Int. Cl.
*G06F 21/34* (2013.01)
*G07C 9/00* (2020.01)
*G08B 21/22* (2006.01)

(52) U.S. Cl.
CPC ......... *G06F 21/34* (2013.01); *G07C 9/00309* (2013.01); *G08B 21/22* (2013.01)

(58) Field of Classification Search
CPC ....... G08B 21/22; G06F 21/316; G06F 21/31; G07C 9/32; G07C 9/27; G07C 9/00896; G07C 9/00174
USPC .......................................... 340/5.2
See application file for complete search history.

(56) References Cited

U.S. PATENT DOCUMENTS

| | | | |
|---|---|---|---|
| 2009/0228962 A1* | 9/2009 | Pathak ................ | G06F 21/629 726/5 |
| 2015/0150101 A1* | 5/2015 | Novack ............... | H04L 63/0861 726/7 |
| 2015/0324589 A1* | 11/2015 | Thanos ................ | G06F 21/60 726/1 |
| 2017/0118591 A1 | 4/2017 | Fournier et al. | |

FOREIGN PATENT DOCUMENTS

| | | |
|---|---|---|
| JP | 2004206363 A | 7/2004 |
| JP | 2017174226 A | 9/2017 |

* cited by examiner

*Primary Examiner* — Vernal U Brown
(74) *Attorney, Agent, or Firm* — Laurence A. Greenberg; Werner H. Stemer; Ralph E. Locher

(57) ABSTRACT

A method protects a technical installation that enables physical entry by persons to the installation and a computerized access to a computer device of the installation. Persons who have current access to the computer device are registered as persons accessing the computer device leading to a formation of registered computer user data, and persons who are present in the installation are registered as persons present on site leading to a formation of registered on-site data. In the event of a new desired entry or a new desired access, a plausibility check is carried out in which a check is made as to whether the desired entry is plausibly compatible with the registered computer user data or whether the desired access is plausibly compatible with the registered on-site data.

15 Claims, 10 Drawing Sheets

METHOD AND DEVICE FOR PROTECTING A TECHNICAL INSTALLATION

CROSS-REFERENCE TO RELATED APPLICATION

This application claims the priority, under 35 U.S.C. § 119, of European application EP 18208836.9, filed Nov. 28, 2018; the prior application is herewith incorporated by reference in its entirety.

BACKGROUND OF THE INVENTION

Field of the Invention

The invention relates to a method for protecting a technical installation that enables physical or bodily entry by persons to the installation and a computerized access to a computer device of the installation.

SUMMARY OF THE INVENTION

The invention is based on the object of improving a method of this type with a view to preventing unauthorized access or entry attempts.

This object is achieved according to the invention by a method with the characteristics of the independent claim. Advantageous embodiments of the method according to the invention are given in the dependent claims.

It is accordingly provided according to the invention that persons who have current access to the computer device are registered as persons accessing the computer device with the formation of computer user data, and persons who are present in the installation are registered as persons present on site with the formation of on-site data and, in the event of a new desired entry or a new desired access, a plausibility check is carried out in which a check is made as to whether the desired entry is plausibly compatible with the registered computer user data or whether the desired access is plausibly compatible with the registered on-site data.

An important advantage of the method according to the invention can be seen in that the computer user data according to the invention are compared with on-site data and, in the event of implausible data records, misuse is deduced and an access or entry can be prevented under certain circumstances, even when entry data that would in itself enable an entry or access are used in connection with the entry or access attempt. It is thus, for example, possible under certain circumstances with the aid of the plausibility check to prevent entry attempts or access attempts on the basis of stolen entry data.

In the case of a desired entry, entry is preferably denied if a plausibility problem is established.

In the case of a desired access, access is preferably denied if a plausibility problem is established.

Alternatively or in addition, it can be provided in an advantageous manner that in the event of a plausibility problem being established by the plausibility check, an alarm signal is generated.

It can also be provided that, in the event of a desired entry, the entry is only granted if the plausibility check does not yield a plausibility problem, and/or in the event of a desired access, the access is only granted if the plausibility check does not yield a plausibility problem.

In the event of an entry attempt of a person into the installation, a check is preferably made as to whether the person is registered at that moment as a person accessing the computer device; if this is the case, a plausibility problem is preferably deduced.

If the computer device allows remote access, in the event of an entry attempt of a person into the installation, a check is preferably made as to whether the person is registered at that moment as a person accessing by remote access; if this is the case, a plausibility problem is preferably deduced.

It is also advantageous if in the event of an entry attempt of a person into the installation, a check is made as to whether the person was registered during a security interval of predetermined length prior to this moment as a person accessing the computer device; if this is the case, a plausibility problem is preferably deduced.

In the case of a computer device with remote access, it is thus advantageous if, in the event of an entry attempt of a person into the installation, a check is made as to whether the person was registered during a security interval of predetermined length prior to this moment as a person accessing by remote access; if this is the case, a plausibility problem is preferably deduced.

In the event of an access attempt to the computer device taking place on site, a check is preferably made as to whether the person making the access is registered at that moment as being present in the installation, and if this is not the case, a plausibility problem is preferably deduced.

If the computer device allows remote access, then in the event of a desired remote access a check is preferably made as to whether the person at this moment is registered as being present in the installation or was registered during a security interval of predetermined length prior to this moment as being present in the installation and, if this is the case, a plausibility problem is preferably deduced.

A substation of an electrical energy distribution system is preferably protected as the technical installation.

In the last-mentioned method variant in particular, it is advantageous if a computer device forms a control device of the technical installation or of the substation, or a component of a control device of the technical installation or of the substation, and the plausibility check is carried out by the installation's own computer device or that of the substation and/or a computer device superordinate to this computer device which can be arranged inside the technical installation or outside the technical installation.

The invention furthermore relates to a misuse recognition device for protecting a technical installation that enables physical entry by persons to the installation and a computerized access to a computer device of the installation.

In terms of such a misuse recognition device, it is provided according to the invention that the misuse recognition device contains a first acquisition device that registers persons who have current access to the computer device as persons accessing the computer device with the formation of computer user data. The misuse recognition device contains a second acquisition device that registers persons who are present in the installation as persons present on site with the formation of on-site data. The misuse recognition device has a checking device which, in the event of a new desired entry or a new desired access, carries out a plausibility check in which a check is made as to whether the desired entry is plausibly compatible with the registered computer user data or whether the desired access is plausibly compatible with the registered on-site data.

With respect to the advantages of the misuse recognition device according to the invention, we refer to the above explanations in connection with the method according to the invention.

The misuse recognition device preferably contains an alarm device that generates an alarm signal in the event that a plausibility problem is established.

It is also advantageous if—alternatively or in addition—the misuse recognition device contains an entry control device which in the case of a desired entry where a plausibility problem is established, denies entry and/or in the case of a desired entry only grants entry if the plausibility check does not yield a plausibility problem.

It is also advantageous if—alternatively or in addition—the misuse recognition device contains an access control device which in the case of a desired access where a plausibility problem is established, denies access and/or in the case of a desired access only grants access if the plausibility check does not yield a plausibility problem.

The alarm device, the access control device and/or the entry control device are preferably integrated into the checking device, for example in the form of subsidiary software modules in the case of a realization in software of the checking device as a software checking module.

The checking device of the misuse recognition device is preferably implemented as a software module in the computer device of the technical installation, or in a superordinate computer device.

The invention furthermore relates to a substation that is fitted with a misuse recognition device or is in communication with an external misuse recognition device.

In relation to the substation, it is deemed advantageous if a computer device of the substation is configured as a control device for controlling the substation, and that at least the checking device of the misuse recognition device is implemented as a software module in the computer device of the substation or in an (internal or external) computer device that is superordinate to this computer device.

Other features which are considered as characteristic for the invention are set forth in the appended claims.

Although the invention is illustrated and described herein as embodied in a method and a device for protecting a technical installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

For the sake of a clear overview, the same reference signs have been used in all cases in the figures for identical or comparable components.

Figure 1:
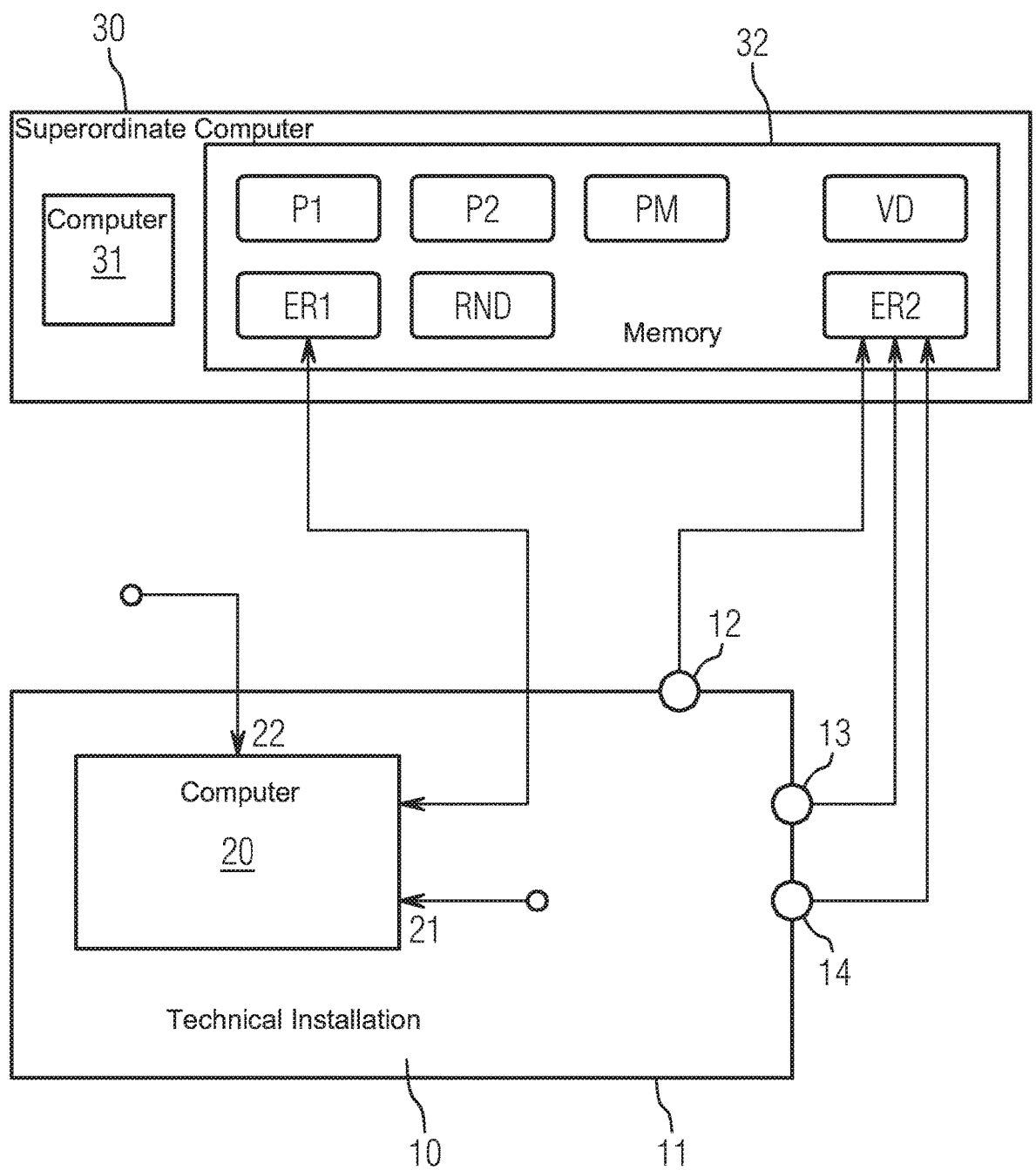
FIG. 1 is a block diagram of an arrangement having a technical installation and an exemplary embodiment for an external misuse recognition device according to the invention, with reference to which exemplary embodiments for the method according to the invention are described by way of example.

Referring now to the figures of the drawings in detail and first, particularly to FIG. 1 thereof, there is shown an exemplary embodiment of an arrangement with a technical installation 10 which is protected against unauthorized trespass or an unauthorized entry by an external protection device 11, for example in the form of a fence, a wall or the like. Entry into the technical installation 10 is only possible at monitored entry points 12, 13 and 14. The technical installation 10 is preferably a substation of an energy distribution system.

The technical installation 10 contains a computer device 20. The computer device 20 contains at least one on-site access interface 21 that enables access to the computer device 20 to persons who are present in the technical installation, i.e. on site; the computer device furthermore contains at least one remote access interface 22 that enables a remote access, i.e. from outside the technical installation 10, to the computer device 20, for example over the Internet. The computer device 20 serves, for example, to control, regulate and/or monitor components of the technical installation 10, for example for switching electrical switches of the technical installation 10 on and/or off.

In the exemplary embodiment according to FIG. 1, an entry into the technical installation 10 and an access to the computer device 20 is monitored by a superordinate computer device 30 located, for example, externally and outside the technical installation 10, which contains at least one computer 31 as well as at least one memory 32.

A data set P1 is stored in the memory 32, in which such persons are listed as may—in the absence of a plausibility problem—receive access to the computer device 20. In a data set P2 of the memory 32, such persons are listed as can—in the absence of a plausibility problem—be granted entry into the technical installation 10.

A first acquisition module ER1 is also stored in the memory 32 which, when executed by the computer 31, forms a first acquisition device; this first acquisition device acquires persons who currently have access to the computer device 20 of the technical installation 10, and registers these as persons accessing the computer device 20, while forming computer user data RND. The computer user data RND are stored in a memory region of the memory 32.

A second acquisition module ER2 is in addition stored in the memory 32 which, when executed by the computer 31, acquires such persons as are present in the technical installation 10 and registers them as persons present on site while forming on-site data VD, and stores the corresponding on-site data VD in a memory region of the memory 32.

The memory 32 contains a checking module PM for plausibility checking which, when executed by the computer 31, forms a checking device, which carries out plausibility checking in the presence of a new desired entry or a new desired access. In the course of the plausibility check, the checking module PM checks whether the desired entry is plausibly compatible with the registered computer user data RND, or whether the desired access is plausibly compatible with the registered on-site data VD.

Figure 2:
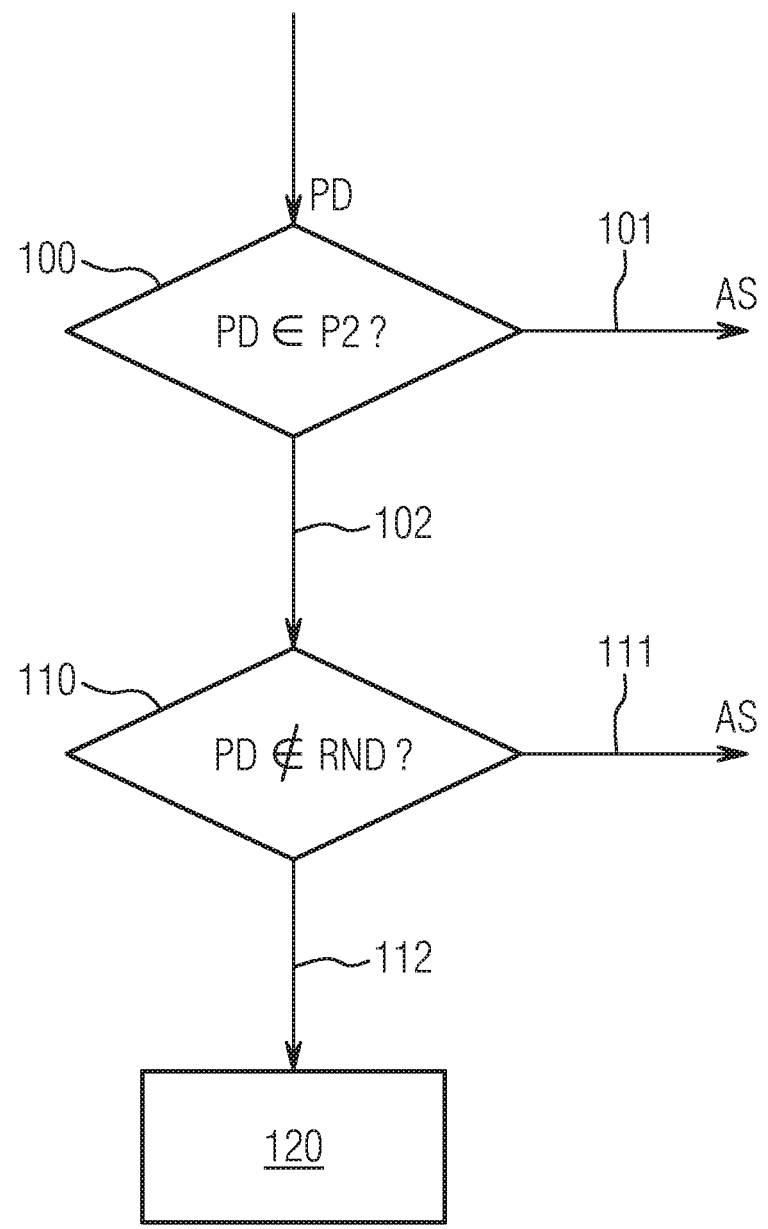
FIG. 2 is a flow chart showing an exemplary embodiment for the mode of operation of the misuse recognition device according to FIG. 1 in the presence of entry attempts.

FIG. 2 shows, by way of example, the mode of operation of the superordinate computer device 30, in particular the mode of operation of the checking module PM or of the checking device formed thereby, in the event of a desired entry.

In the presence of a desired entry at one of the entry points 12, 13 or 14 of the technical installation 10 according to FIG. 1, a check is first made in a check step 100 as to whether the personal data PD input or presented with the desired entry are stored in the data set P2 of the memory 32, and the person identified by the personal data PD is authorized in the first place for an entry into the technical installation. If the check step 100 has a negative result, then according to a branch 101, the entry into the technical installation 10 is denied, and an alarm signal AS that indicates an unauthorized entry attempt into the technical installation 10 is generated.

If the check step 100 has a positive result, then according to a branch 102, the system continues with a plausibility check step 110 in which a check is made as to whether the personal data PD are stored in the computer user data RND. If this is the case, it means that a person who at this moment is already either inside the technical installation 10, i.e. on site, at the on-site access interface 21 or is accessing the computer device 20 by remote access to the remote access interface 22 would like to obtain entry to the technical installation 10, and the desired entry is thus implausible.

If it is established in the plausibility check in step 110 that the personal data PD is contained in the computer user data RND, then according to a branch 111 a plausibility problem is deduced and an alarm signal AS is generated. Entry to the technical installation 10 is blocked at the same time.

If the personal data PD are not contained in the computer user data RND, then entry is enabled in an enable step 120 according to branch 112.

Figure 3:
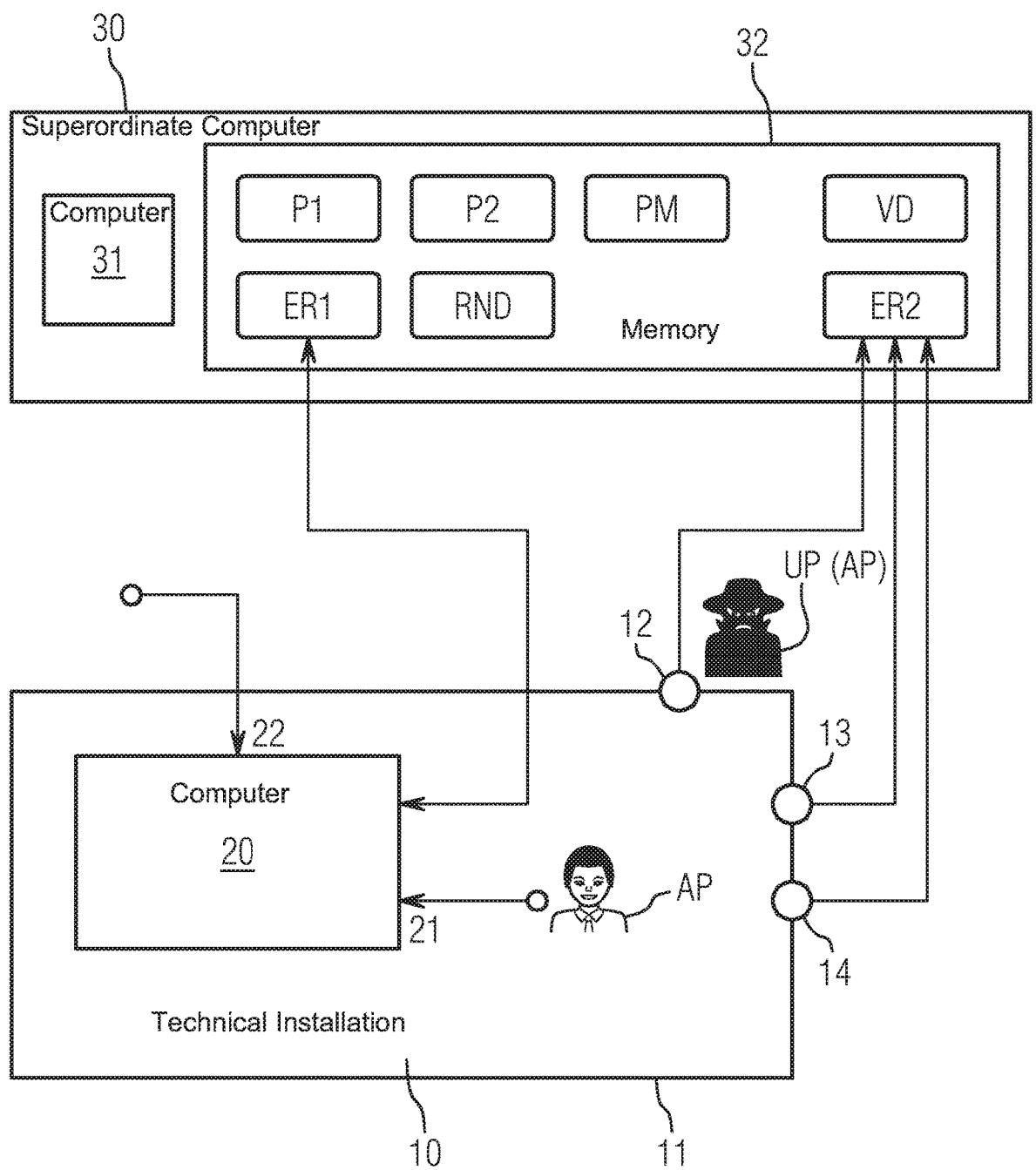
FIG. 3 is a block diagram showing by way of example the recognition of a plausibility problem in the case of an unauthorized entry attempt.

FIG. 3 shows by way of example the case in which an unauthorized person UP with personal data PD of an authorized person AP requests entry to the technical installation 10 at the entry point 12. Since the personal data PD of the authorized person AP are contained in the data set P2 of the memory 32, the check step 100 has a positive result, and the system continues with the plausibility check step 110 according to branch 102.

Since, in the exemplary state according to FIG. 3, the corresponding authorized person AP has or had access to the computer device 20 at the on-site access interface 21 at the moment of the desired entry or in a predefined period of time prior to this desired entry, and their personal data PD is contained in the computer user data RND, the checking module PM will recognize a plausibility problem according to the branch 112 and will generate the alarm signal AS as well as denying the entry.

Figure 4:
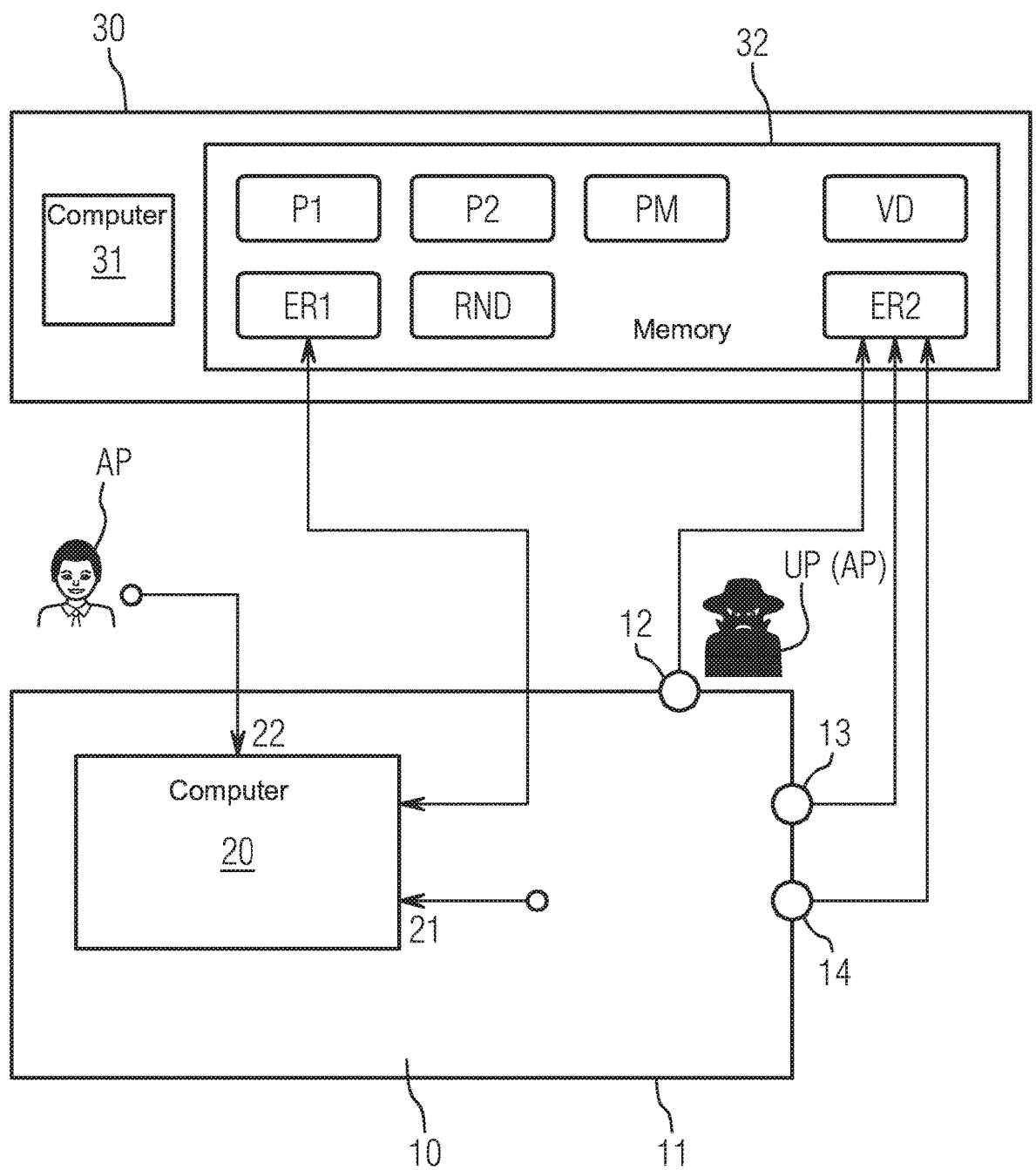
FIG. 4 is a block diagram showing by way of example the recognition of a plausibility problem in the case of another unauthorized entry attempt.

FIG. 4 shows by way of example the case in which an unauthorized person UP with personal data PD of an authorized person AP requests entry to the technical installation 10 at the entry point 12, wherein the authorized person AP has or had access to the computer device 20 at the remote access interface 22 at the moment of the desired entry or in a predefined period of time prior to this desired entry. Since the personal data PD of the authorized person AP are contained in the computer user data RND, the checking module PM will recognize a plausibility problem according to the branch 111 and will generate the alarm signal AS as well as denying entry.

Figure 5:
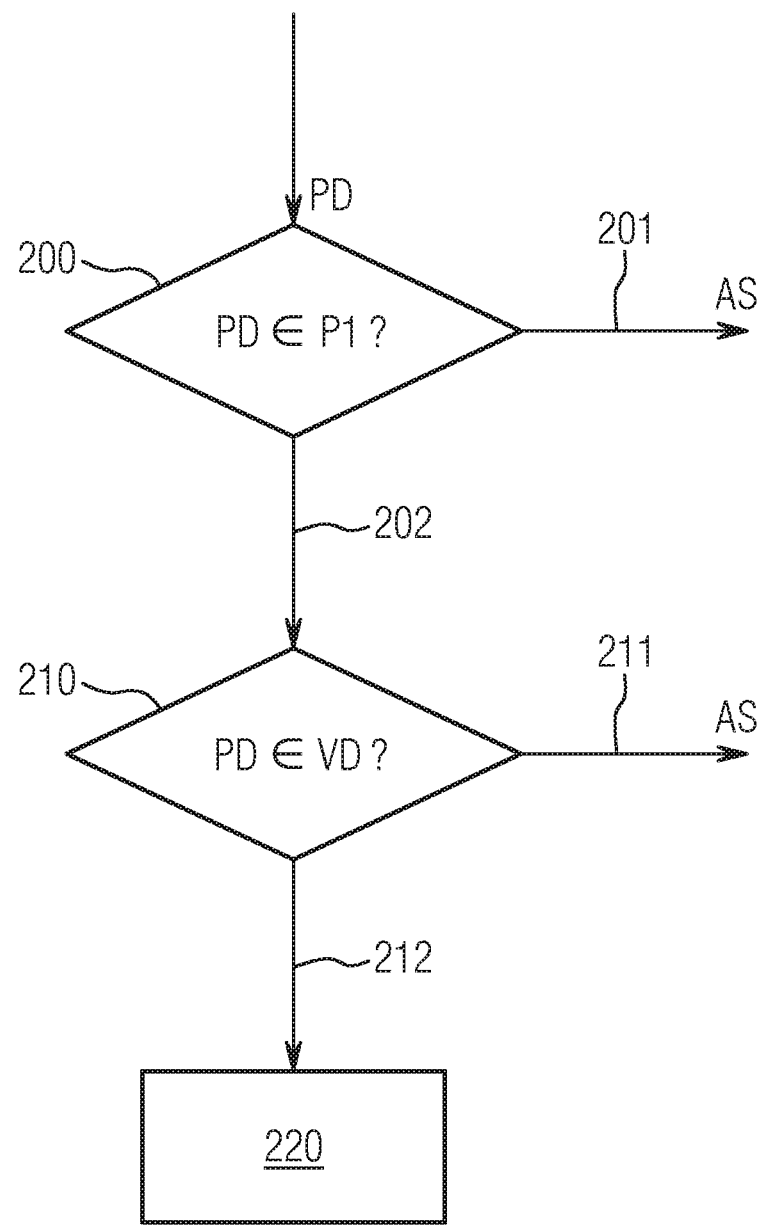
FIG. 5 is a flow chart showing an exemplary embodiment for the mode of operation of the misuse recognition device according to FIG. 1 in the presence of an on-site desired access.

FIG. 5 shows by way of example the mode of operation of the checking module PM of the superordinate computer device 30 in the case of a desired access to the computer device 20 of the technical installation 10. It is assumed here, by way of example, that the desired access is input at the on-site access interface 21 of the computer device 20, i.e. inside the technical installation 10.

The checking module PM will first check, in a check step 200, whether the personal data PD of the accessing person is contained in the data set P1 in which the persons authorized for access are listed. If this is not the case, access is denied according to a branch 201, and an alarm signal AS is generated.

If the personal data PD are contained in the data set P1, then according to a branch 202 a plausibility check step 210, in which a check is made as to whether the personal data PD are contained in the on-site data VD, is carried out. If this is not the case, the checking module PM deduces from this that an unauthorized access attempt is being made, and denies access to the computer device 20 in a branch 211. An alarm signal AS is also generated.

If, on the other hand, the checking module PM establishes that the personal data PD are contained in the on-site data VD, meaning that the person requesting the access at the on-site access interface 21 is indeed present in the technical installation 10, then in an enable step 220 access to the computer device 20 is granted according to branch 212.

Figure 6:
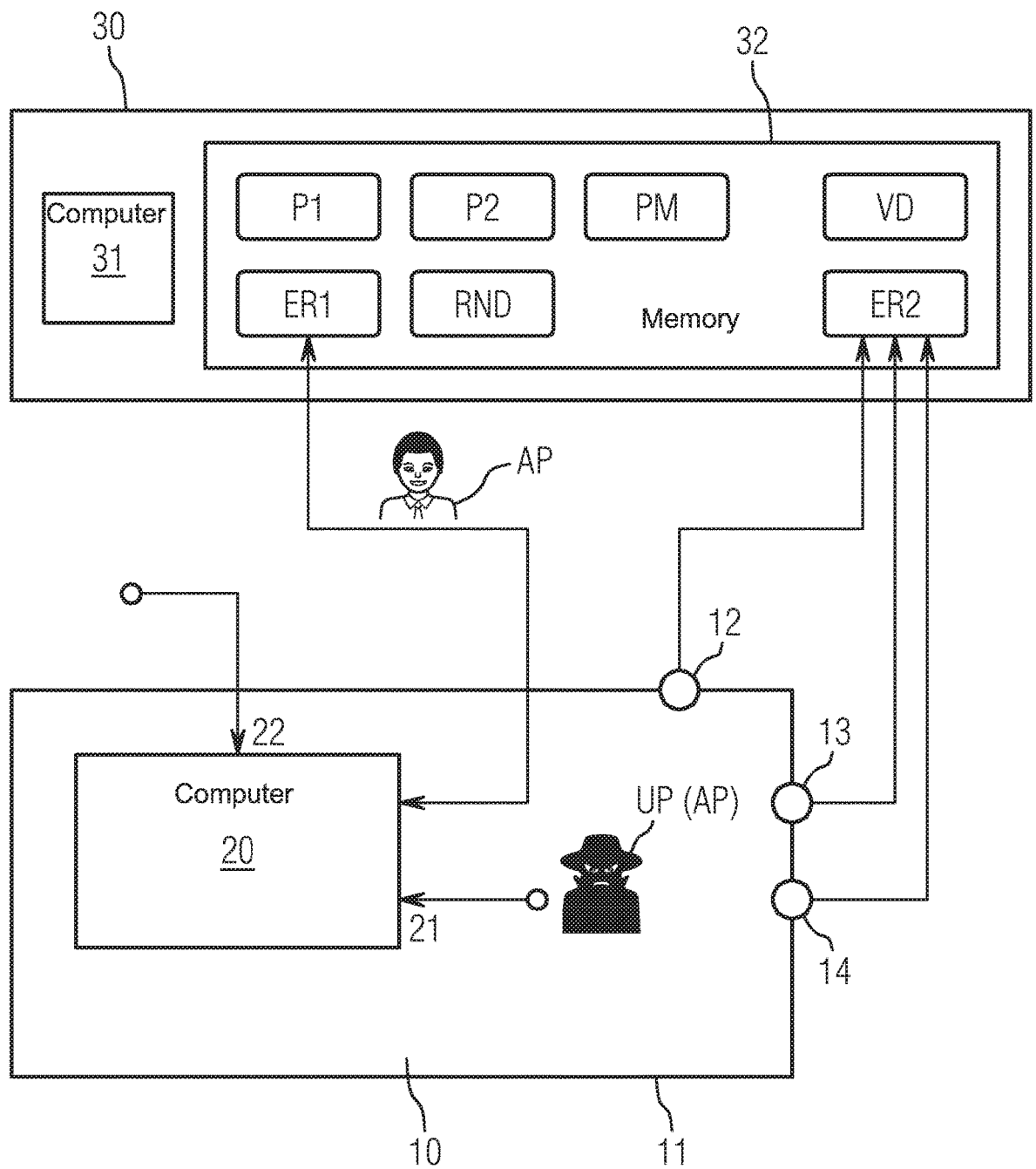
FIG. 6 is a block diagram showing by way of example the recognition of a plausibility problem in the case of an unauthorized on-site desired access.

FIG. 6 shows by way of example the arrangement according to FIG. 1 in the case of an unauthorized access attempt by an unauthorized person UP who performs an access attempt at the on-site access interface 21 with personal data of an authorized person AP. Since the authorized person AP is not registered at this moment—or within a previous security interval—as being present in the technical installation 10, the checking module PM recognizes the corresponding plausibility problem, denies access according to branch 211, and generates an alarm signal AS.

Figure 7:
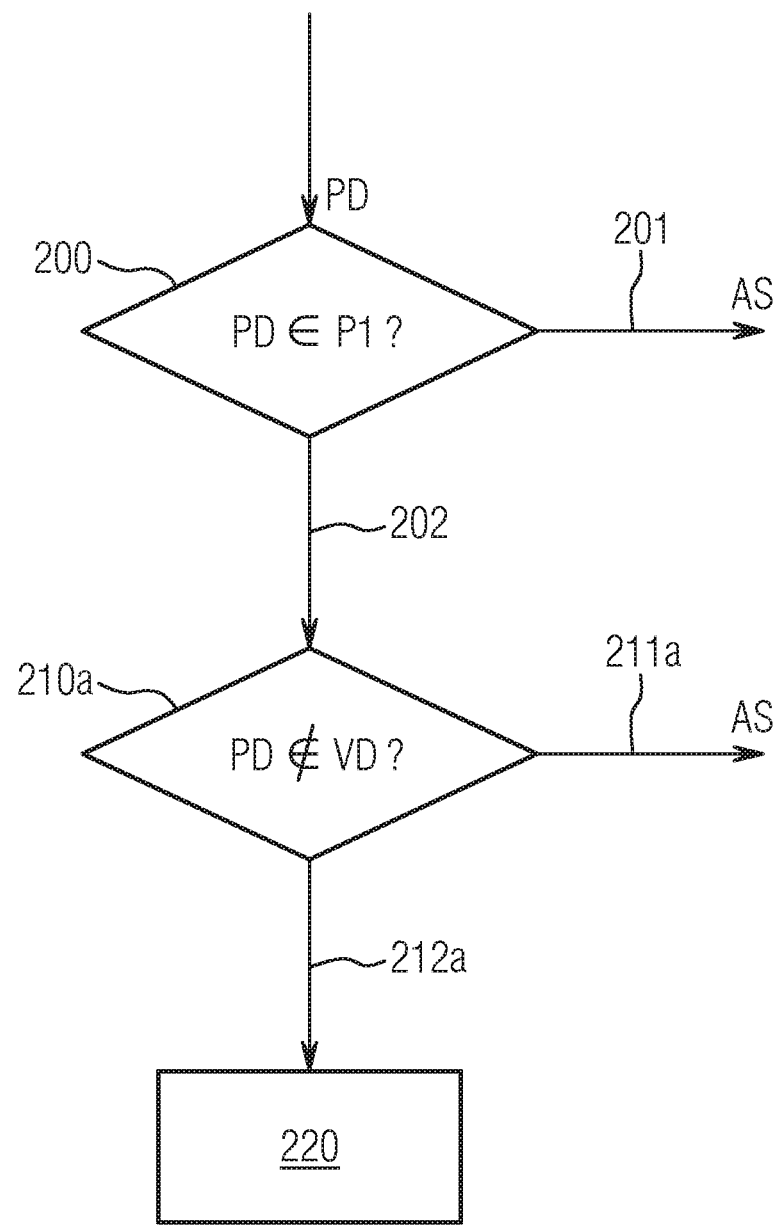
FIG. 7 is a flow chart showing an exemplary embodiment for the mode of operation of the misuse recognition device according to FIG. 1 in the presence of a desired remote access.
Figure 8:
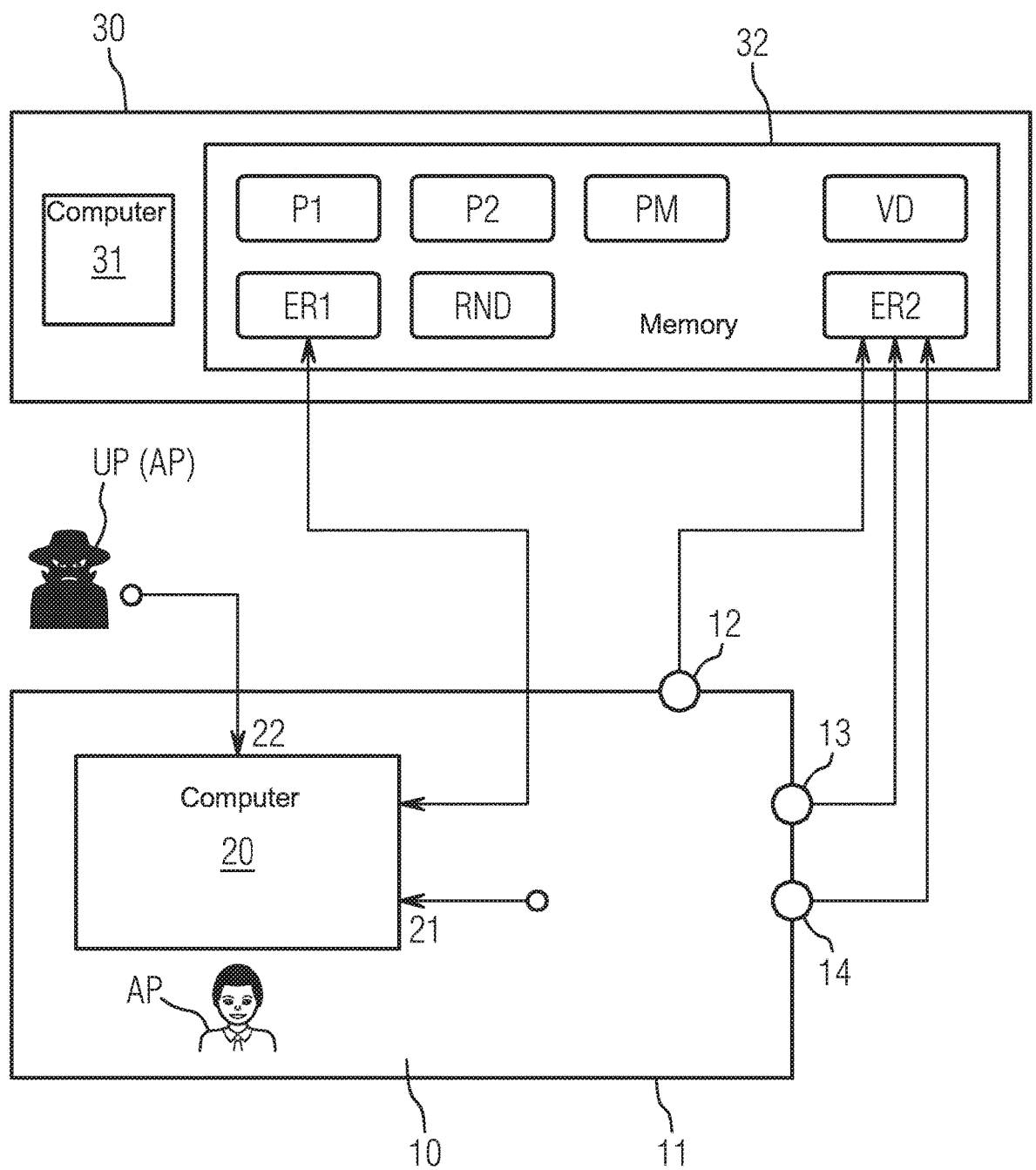
FIG. 8 is a block diagram showing by way of example the recognition of a plausibility problem in the case of an unauthorized desired remote access.

FIG. 7 shows the mode of operation of the checking module PM for the case in which a desired access to the computer device 20 is input via the remote access interface 22. In such a case, a check is made in the plausibility check step 210 as to whether the on-site data VD indicate a presence within the technical installation 10 or not. If the person whose personal data PD are transmitted to the remote access interface 22 in the context of the access attempt is located within the technical installation 10, the checking module PM will deduce a plausibility problem in the plausibility check step 210a, and deny access according to branch 211a as well as generating an alarm signal AS; FIG.

8 shows such a situation by way of example. Otherwise the enable will follow in the enable step 220 according to branch 212a.

In the exemplary embodiments explained in connection with FIGS. 1 to 8, the checking module PM, the first acquisition module ER1 and the second acquisition module ER2, when executed by the computer 31, constitute a misuse recognition device which, in cases of access to the computer device 20 or a desired entry into the technical installation 10, carries out a plausibility check, as has been explained above.

The checking module PM, or the checking device formed by this, also performs the function of an access control device and the function of an entry control device, so that—as explained in connection with FIGS. 1 to 8—it itself allows or itself prevents the access and/or entry, depending on the result of the plausibility check.

Figure 9:
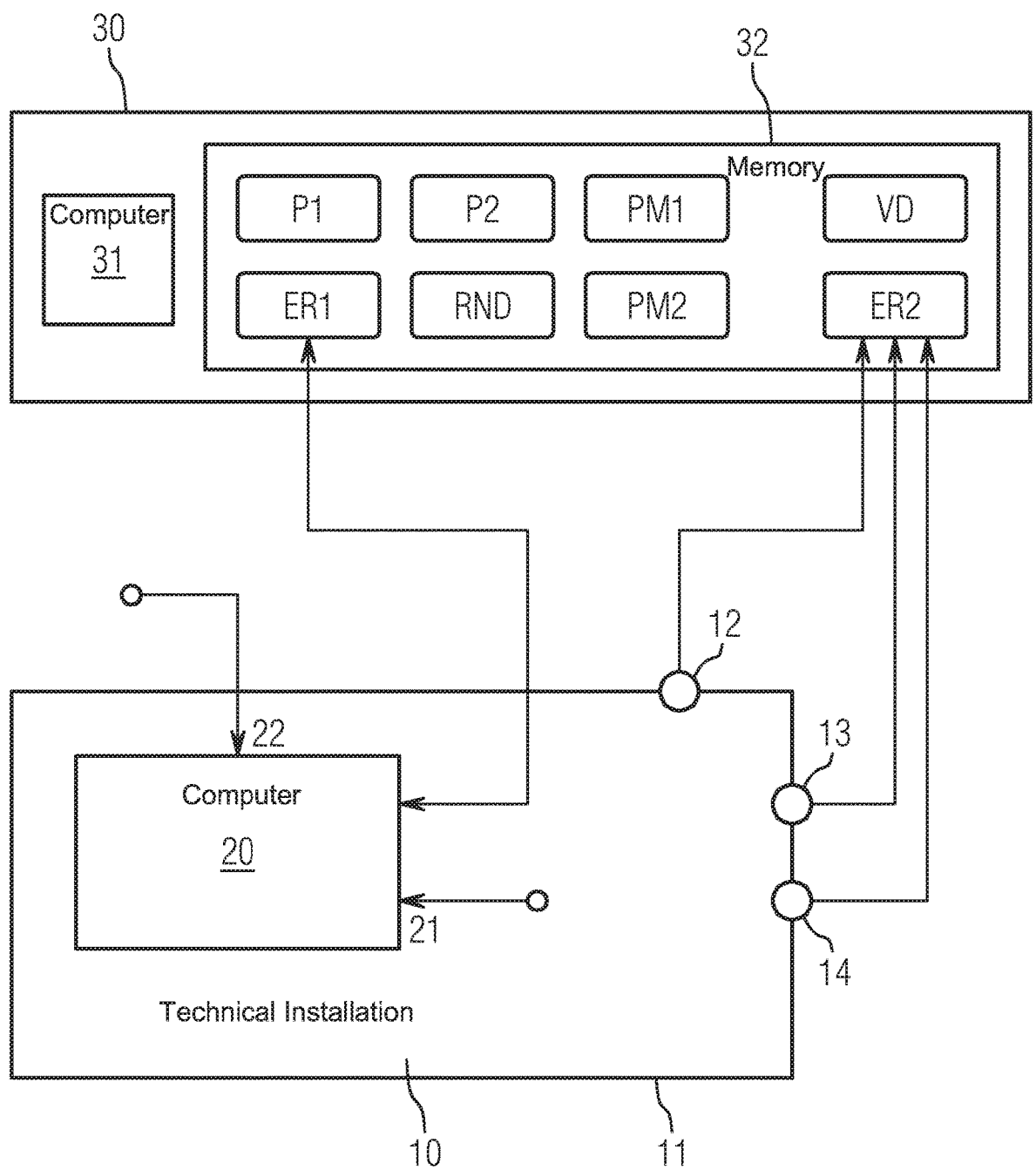
FIG. 9 is a block diagram showing a further exemplary embodiment for an arrangement with a technical installation and an external misuse recognition device, wherein the misuse recognition device comprises a checking module for processing desired entries and a checking module for processing desired accesses.

FIG. 9 shows a variant embodiment in which two checking modules PM1 and PM2 are present.

The checking module PM1 serves, when executed by the computer 31, to carry out a plausibility check in the event of a desired entry at one of the entry points 12, 13 or 14, and to grant or prevent the entry. The checking module PM1 can, for example, operate in the manner that was explained in connection with FIGS. 2 to 4.

The checking module PM2 serves, when executed by the computer 31, to carry out a plausibility check in the event of a desired access at the on-site access interface 21 or the remote access interface 22, and to grant or prevent the access. The checking module PM2 can, for example, operate in the manner that was explained in connection with FIGS. 5 to 8.

The computer device 30 can, moreover, also comprise more than one computer 31 and more than one memory 32 which can, for example, be spatially separate and cooperate in a cloud structure. In this case, one of the computers can, for example, execute the checking module PM1 at a first plausibility check site, and carry out a plausibility check in the event of a desired entry at one of the entry points 12, 13 or 14, as was explained in connection with FIGS. 2 to 4.

Another one of the computers can, in such a variant embodiment, execute the checking module PM2 at a second plausibility check site, and carry out a plausibility check in the event of a desired access at the on-site access interface 21 or the remote access interface 22, as was explained in connection with FIGS. 5 to 8.

The acquisition modules ER1 and ER2 can be executed by one or both of the computers or by other computers of the computer device 30. The datasets P1 and P2, the computer user data RND and the on-site data VD can be stored in one of the memories of the computer device 30 or distributed over a plurality of memories of the computer device 30.

Figure 10:
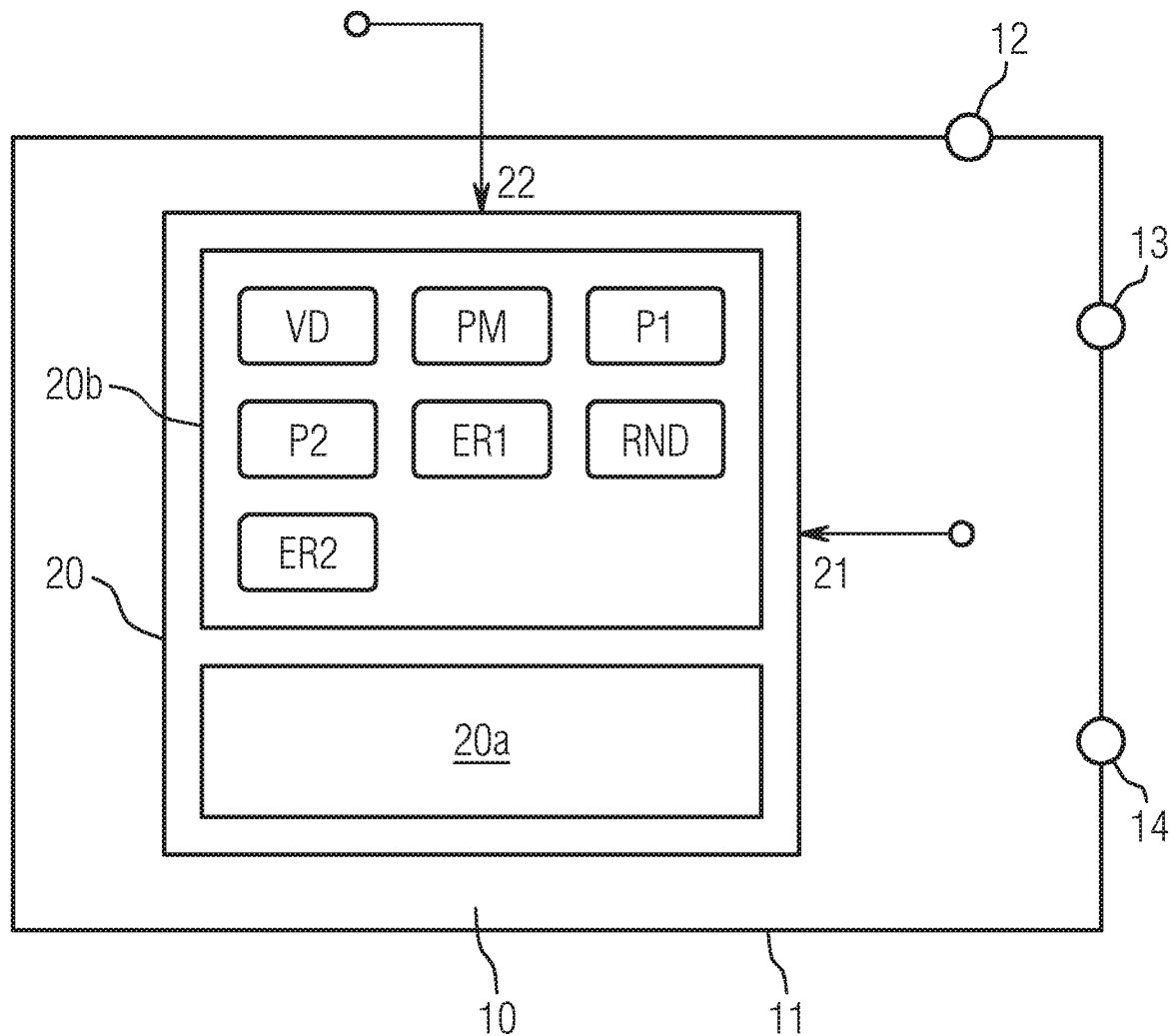
FIG. 10 is a block diagram showing an exemplary embodiment for an arrangement with a technical installation and an internal misuse recognition device which is integrated into a computer device of the technical installation.

FIG. 10 shows a further exemplary embodiment of a misuse recognition device that is formed by a checking module PM, a first acquisition module ER1 and a second acquisition module ER2, as was explained above in connection with FIGS. 1 to 8. In contrast to the exemplary embodiment according to FIGS. 1 to 8, in the exemplary embodiment according to FIG. 10 it is provided that the checking module PM and the two acquisition modules ER1 and ER2 are implemented in the computer device 20 of the technical installation 10, and a plausibility check, as described above, is carried out by the internal computer device 20 of the technical installation 10 itself.

The computer device 20 comprises, for example, a computer 20a and a memory 20b, in which the checking module PM, the first acquisition module ER1 and the second acquisition module ER2 are stored. In this regard, the above explanations in connection with the external computer device 30 of the exemplary embodiment according to FIGS. 1 to 8 apply correspondingly.

Although the invention has been more closely illustrated and described in more detail through preferred exemplary embodiments, the invention is not restricted by the disclosed examples, and other variations can be derived from this by the expert without going beyond the scope of protection of the invention.

LIST OF REFERENCE SIGNS

10 Installation
11 Protection device
12 Entry point
13 Entry point
14 Entry point
20 Computer device
20a Computer
20b Memory
21 On-site access interface
22 Remote access interface
30 Computer device
31 Computer
32 Memory
100 Check step
101 Branch
102 Branch
110 Plausibility check step
111 Branch
112 Branch
120 Enable step
200 Check step
201 Branch
202 Branch
210 Plausibility check step
211 Branch
211a Branch
212 Branch
212a Branch
220 Enable step
AP Authorized person
AS Alarm signal
ER1 Acquisition module
ER2 Acquisition module
P1 Data set
P2 Data set
PM Checking module
PM1 Checking module
PM2 Checking module
RND Computer user data
UP Unauthorized person
VD On-site data

The invention claimed is:

1. A method for protecting a technical installation that enables physical entry by persons to the technical installation and computerized access to a computer device of the technical installation, which comprises the steps of:
registering persons who have current access to the computer device as persons accessing the computer device leading to a formation of registered computer user data;
registering persons who are present in the technical installation as persons present on site leading to a formation of registered on-site data, wherein the registered computer user data and the registered on-site data contain the persons who are currently accessing the computer device and the persons who are currently, at a same time, present in the technical installation;

carrying out a plausibility check, in an event of a new desired entry or a new desired access, in which a check is made as to whether the new desired entry is plausibly compatible with the registered computer user data or whether the new desired access is plausibly compatible with the registered on-site data;

in an event of a plausibility problem being established by the plausibility check, generating an alarm signal; and in an event of the new desired entry with an establishment of the plausibility problem, denying the entry; and in an event of the new desired access with an establishment of the plausibility problem, denying the access; and in an event of the new desired entry, granting an entry only if the plausibility check does not yield the plausibility problem; and in an event of the new desired access, granting an access only if the plausibility check does not yield the plausibility problem.

2. The method according to claim 1, wherein in an event of an entry attempt of a person into the technical installation, performing a check as to whether the person is registered at that moment as a person accessing the computer device and, if this is the case, a plausibility problem is deduced.

3. The method according to claim 1, wherein the computer device allows remote access, and in an event of an entry attempt of a person into the technical installation, performing a check as to whether the person is registered at that moment as a person accessing by remote access and, if this is the case, a plausibility problem is deduced.

4. The method according to claim 1, wherein in an event of an entry attempt of a person into the technical installation, performing a check as to whether the person was registered during a security interval of predetermined length prior to this moment as a person accessing the computer device and, if this is the case, a plausibility problem is deduced.

5. The method according to claim 1, wherein the computer device allows remote access, and in an event of an entry attempt of a person into the technical installation, performing a check as to whether the person was registered during a security interval of predetermined length prior to this moment as a person accessing by remote access and, if this is the case, a plausibility problem is deduced.

6. The method according to claim 1, wherein in an event of an access attempt to the computer device taking place on site, performing a check as to whether a person making the access attempt is registered at that moment as being present in the technical installation, and if this is not the case, a plausibility problem is deduced.

7. The method according to claim 1, wherein the computer device allows remote access, and in an event of a desired remote access performing a check as to whether a person at this moment is registered as being present in the technical installation or was registered during a security interval of predetermined length prior to the moment as being present in the technical installation and, if this is the case, a plausibility problem is deduced.

8. The method according to claim 1, wherein a substation of an electrical energy distribution system is protected as the technical installation.

9. The method according to claim 8, wherein the computer device forms a control device of the substation or a component of a control device of the substation, and the computer device and/or a further computer device that is superordinate to the computer device performs the plausibility check.

10. A misuse recognition device for protecting a technical installation that enables physical entry by persons to the technical installation and a computerized access to a computer device of the technical installation, the misuse recognition device comprising:

a first acquisition device that registers persons who have current access to the computer device as persons accessing the computer device leading to a formation of registered computer user data;

a second acquisition device that registers persons who are present in the technical installation as persons present on site leading to a formation of registered on-site data, wherein the registered computer user data and the registered on-site data contain the persons who are currently accessing the computer device and the persons who are currently, at a same time, present in the technical installation; and a checking device which, in an event of a new desired entry or a new desired access, carries out a plausibility check in which a check is made as to whether the new desired entry is plausibly compatible with the registered computer user data or whether the new desired access is plausibly compatible with the registered on-site data;

the checking device configured to:

in an event of a plausibility problem being established by the plausibility check, generate an alarm signal; and in an event of the new desired entry with an establishment of the plausibility problem, deny the entry; and in an event of the new desired access with an establishment of the plausibility problem, deny the access; and in an event of the new desired entry, grant an entry only if the plausibility check does not yield the plausibility problem; and in an event of the new desired access, grant an access only if the plausibility check does not yield the plausibility problem.

11. The misuse recognition device according to claim 10, further comprising:

an alarm device generating an alarm signal in an event that a plausibility problem is established; and/or an entry control device which in a case of the new desired entry where the plausibility problem is established, denies entry and/or in a case of the new desired entry only grants entry if the plausibility check does not yield the plausibility problem;

and/or an access control device which in a case of the new desired access where the plausibility problem is established, denies access and/or in the case of the new desired access only grants access if the plausibility check does not yield the plausibility problem.

12. The misuse recognition device according to claim 10, wherein said checking device is implemented as a software module in the computer device of the technical installation or in a further computer device that is superordinate to the computer device.

13. A substation, comprising:

the misuse recognition device according to claim 10.

14. The substation according to claim 13, wherein the computer device is configured as a control device for controlling the substation, and at least said checking device of said misuse recognition device is implemented as a software module in said computer device of the substation or in a further computer device that is superordinate to said computer device of the substation.

15. A method for protecting a substation of an electrical energy distribution system that enables physical entry by persons to the substation and computerized access to a computer device of the substation, which comprises the steps of:

registering persons who have current access to the computer device as persons accessing the computer device leading to a formation of registered computer user data;

registering persons who are present in the substation as persons present on site leading to a formation of registered on-site data, wherein the registered computer user data and the registered on-site data contain the persons who are currently accessing the computer device and the persons who are currently, at a same time, present in the substation;

carrying out a plausibility check, in an event of a new desired entry or a new desired access, in which a check is made as to whether the new desired entry is plausibly compatible with the registered computer user data or whether the new desired access is plausibly compatible with the registered on-site data; and in an event of a plausibility problem being established by the plausibility check, generating an alarm signal; and in an event of the new desired entry with an establishment of the plausibility problem, denying the entry; and in an event of the new desired access with an establishment of the plausibility problem, denying the access; and in an event of the new desired entry, granting an entry only if the plausibility check does not yield the plausibility problem; and in an event of the new desired access, granting an access only if the plausibility check does not yield the plausibility problem.

\* \* \* \* \*